United States Patent
Cloutier

[15] 3,672,091
[45] June 27, 1972

[54] ENDLESS FISHING CABLE INSTALLATION

[72] Inventor: Emeric Cloutier, Rue Principale, Mont St. Pierre, Gaspe-North, Quebec, Canada

[22] Filed: May 11, 1970

[21] Appl. No.: 39,192

[52] U.S. Cl.................................43/27.4, 43/6.5, 43/27.2, 254/195
[51] Int. Cl...............................A01k 79/00, A01k 91/00
[58] Field of Search ...............43/27.4, 6.5, 27.2, 44.84; 254/195, 194, 187

[56] References Cited

UNITED STATES PATENTS

| | | | |
|---|---|---|---|
| 578,248 | 3/1897 | Layne | 43/27.4 |
| 1,300,953 | 4/1919 | Golding | 254/190 |
| 523,561 | 7/1894 | White | 43/27.4 |
| 2,037,232 | 4/1936 | Hendriks | 43/27.4 X |
| 2,792,658 | 5/1957 | Stafford | 43/27.4 UX |
| 3,003,585 | 10/1961 | Andersson | 254/185 X |
| 2,709,287 | 5/1955 | Shelton et al. | 43/42.74 UX |

Primary Examiner—Aldrich F. Medbery
Assistant Examiner—J. F. Pitrelli
Attorney—Pierre Lesperance

[57] ABSTRACT

A fishing installation having an endless cable to which are attached a number of fish-lines in spaced-apart relationship along the length of the endless cable which is supported by two shore pulleys and one offshore submerged pulley mounted on a baseplate adapted to be anchored at the bottom of a body of water. The two shore pulleys are pivotable up and down relative to an horizontal axis and an endless cable advance mechanism is provided between the two shore pulleys to advance the endless cable.

2 Claims, 18 Drawing Figures

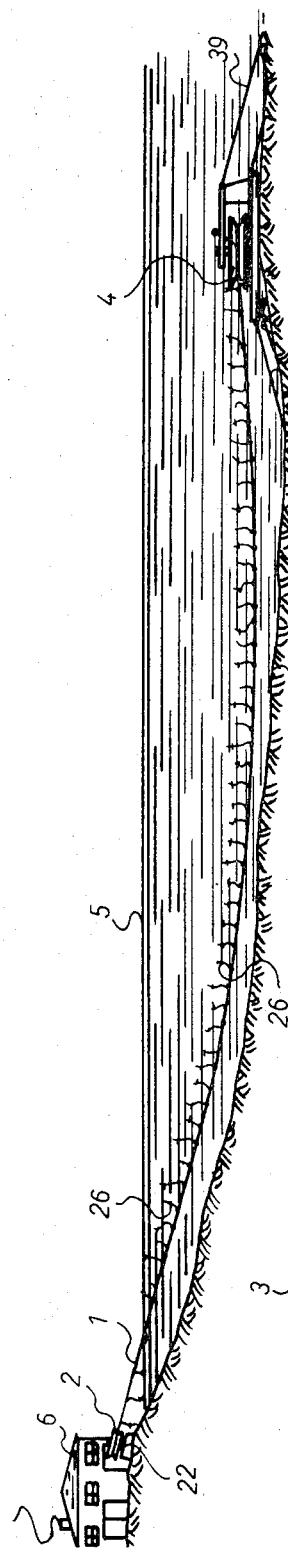
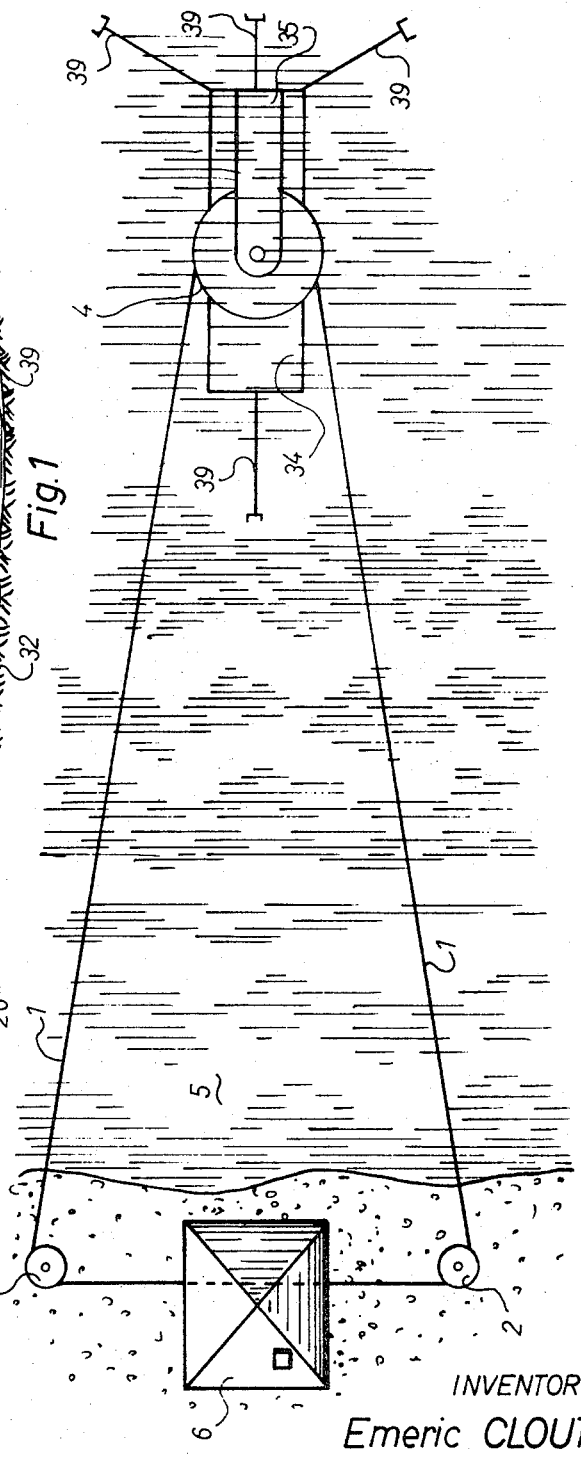
Fig.1
Fig.2
INVENTOR
Emeric CLOUTIER
BY Pierre Lespérance
AGENT

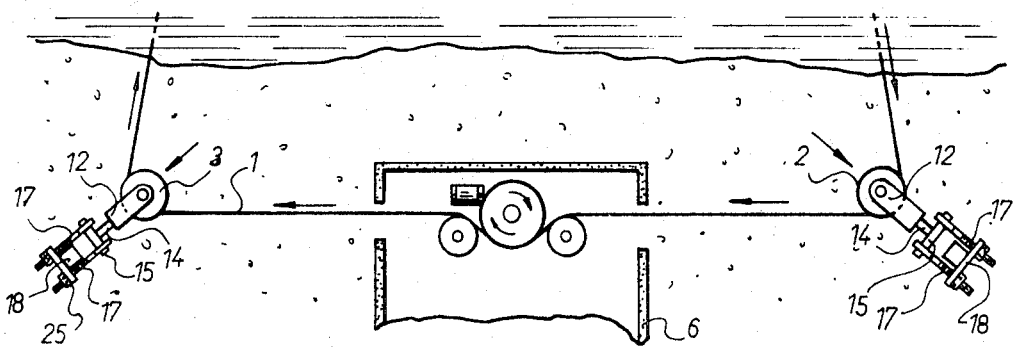
Fig. 3
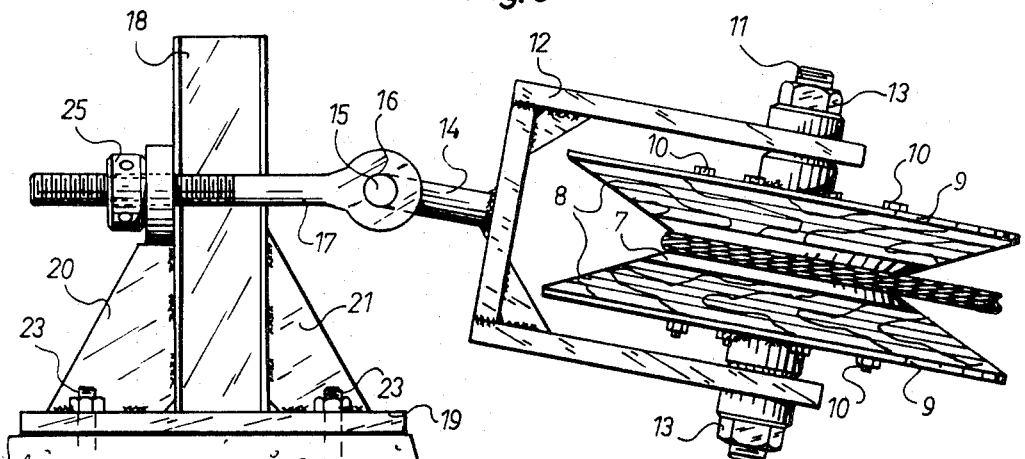
Fig. 4
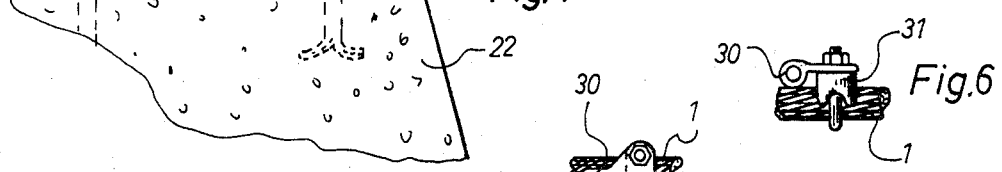
Fig. 7
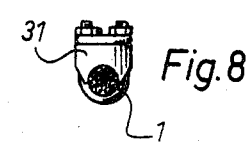
Fig. 6
Fig. 8
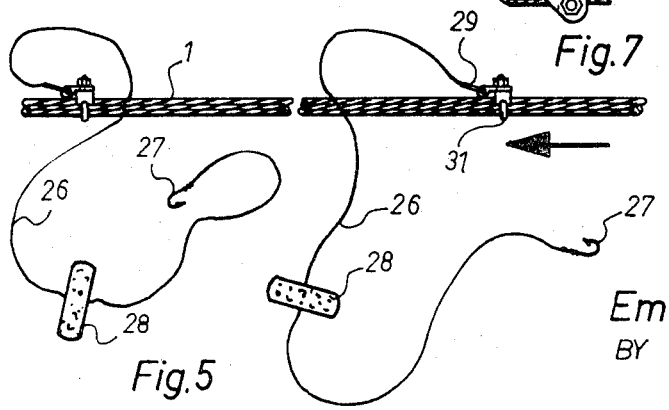
Fig. 5
INVENTOR
Emeric CLOUTIER
BY Pierre Lespérance
AGENT INVENTOR
Emeric CLOUTIER
BY Pierre Lespérance
AGENT

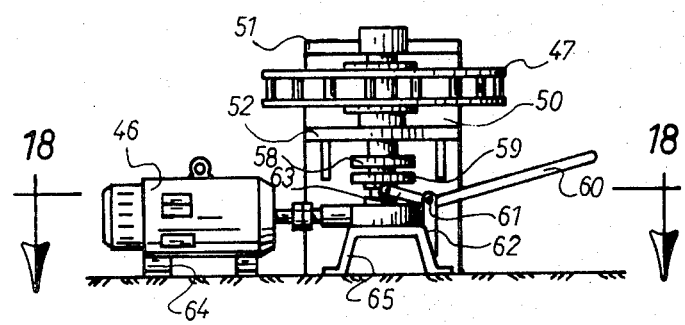
Fig.15
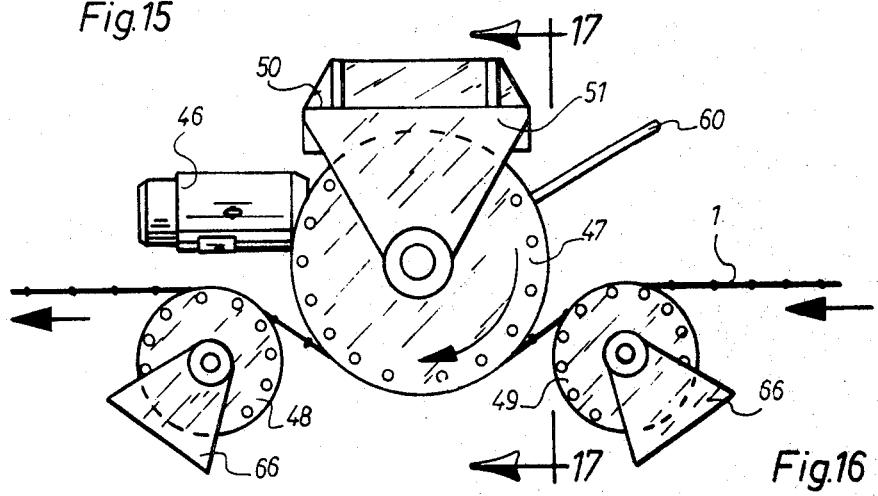
Fig.16
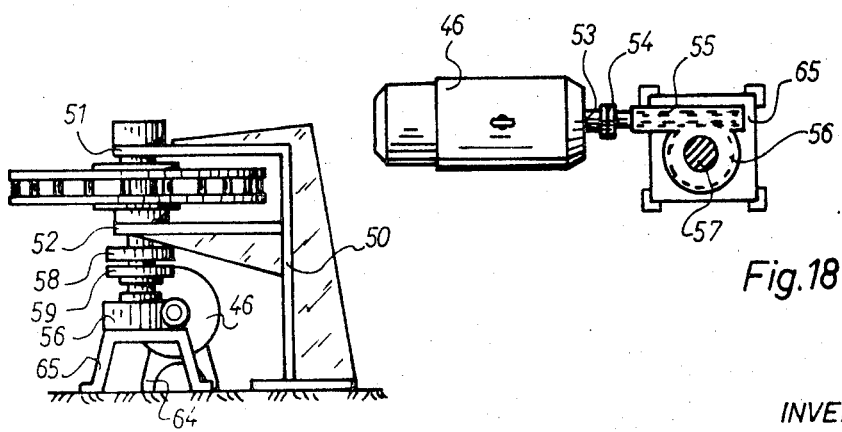
Fig.17
Fig.18
INVENTOR
Emeric CLOUTIER
BY
AGENT

ENDLESS FISHING CABLE INSTALLATION

The present invention relates to an endless fishing cable adapted to be installed on the shore of a body of water and, more particularly, to an endless fishing cable mounted on pulleys allowing advance of the cable.

There have been proposed numerous trawl line installations wherein an endless cable is run across a stream and supported between two posts respectively anchored on the opposite banks of the stream and fish-lines are attached to the endless cable such as hooks on said fish-lines will drag into the water for catching fish. It was proposed to actuate such trawl lines by means of a crank connected to one of the pulleys. All the trawl lines so far proposed are of light construction and extend near the water surface, which constitutes a serious hazard to the navigation.

The present invention proposes an improved endless fishing cable installation of solid construction particularly adapted for more versatile applications. The present invention does not impair nor endanger navigation. This advantage is achieved by placing an offshore pulley down on the bottom of a body of water at a distance from the shoreline, thereby submerging most of the cable at a sufficient depth into the water to allow fishing in deep water and under the ice.

An additional advantage of the invention is that the ice formation around the submerged offshore pulley or on the endless cable will be either prevented or considerably retarded, hence allowing extension of the fishing season.

The endless fishing cable installation of the invention includes a control station located intermediate two pulleys and a motor drive at the control station adapted to advance the cable along its endless path.

A shelter is provided over the control station allowing use of the endless fishing cable installation by all kinds of weather and even at night.

These and other advantages of the invention will be more readily understood when the following description is read in connection with the accompanying drawings, in which:

FIG. 1 is a side view of the invention in installed position;

FIG. 2 is a top schematic view of the invention;

FIG. 3 is a top view of the shore arrangement showing the control station schematically;

FIG. 4 is an enlarged side view of a shore pulley structure;

FIG. 5 is a view of a length of the endless cable with fish-lines attached thereto;

Figure 10:
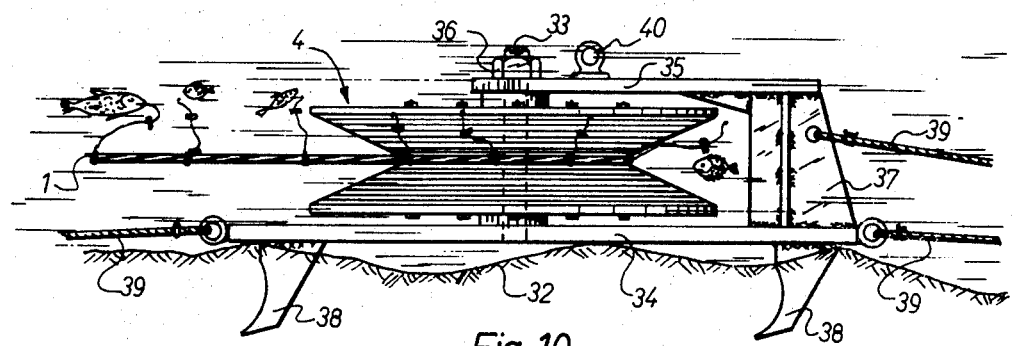
Figure 11:
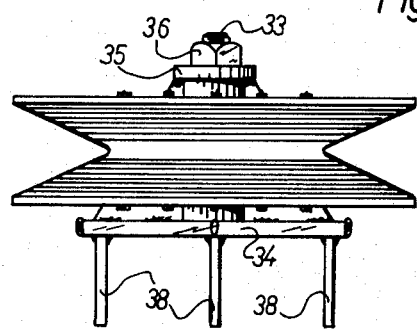
Figure 14:
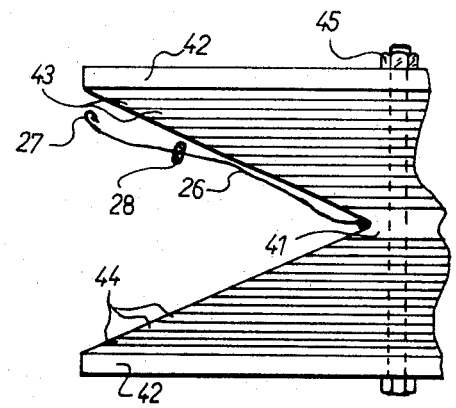
Figure 12:
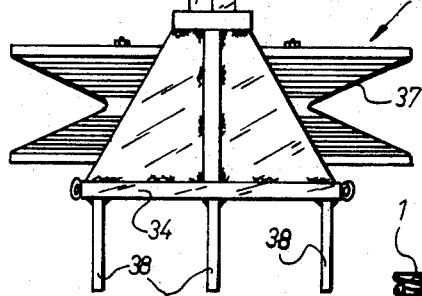
Figure 9:
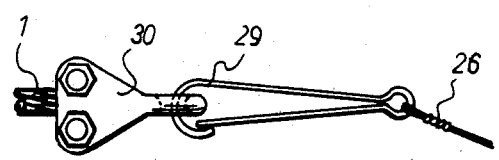
Figure 13:
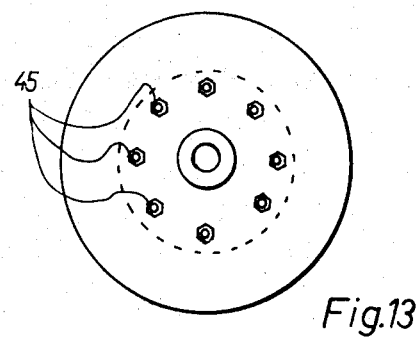

FIGS. 6, 7, and 8 are side top and end views respectively of a clamp to attach a fish-line to the endless cable;

FIG. 9 is an enlarged view of a snap-hook attaching a fish-line to a clamp;

FIG. 10 is an enlarged view of the offshore submerged pulley and its supporting structure;

FIGS. 11 and 12 are front and rear views respectively of the offshore pulley and its supporting structure;

FIGS. 13 and 14 are top and partial side views respectively of the offshore pulley;

FIGS. 15 and 16 are side and top views respectively of the motor drive for the endless cable;

FIG. 17 is an elevation view as seen along line 17—17 of FIG. 16; and

FIG. 18 is a top view in section, as seen along line 18-18 of FIG. 15.

FIGS. 1 and 2 shown a general outline of one layout of the invention. As endless cable 1 extends around three pulleys 2, 3, and 4. Pulleys 2 and 3 are mounted on the shore adjacent the body of water 5. A control station including a shelter or building 6, is located on the shore intermediate the shore pulleys 2 and 3 and such that the endless cable 1 runs through the shelter 6.

FIG. 3 shows that the shore pulleys 2 and 3 are similarly mounted and FIG. 4 illustrates the details of their mountings. In the embodiment illustrated, pulleys 2 and 3 are formed of a central core 7 of metal flanged by layers 8 of wood sandwiched between core 7 and side reinforcements 9 of metal. A number of bolts 10 are disposed circumferentially and project transversely through the composite pulleys 2 and 3 to hold the layers 7, 8, and 9 together. Pulleys 2 and 3 need not be of the specific construction shown and described. On the contrary, they can be of any appropriate construction and manufacture. Pulleys 2 and 3 can be of any suitable material, such as metal, wood or plastic or any combination thereof. Each of the pulleys 2 and 3 is rotatably mounted on an axle 11, which is held by a U-shape support 12. Nuts 13 screwed on the threaded ends of the axle 11 serve to fix the latter to the U-shape support.

A stud 14 is fixed to the base of the U-shape support 12 and extends outwardly thereof. The free end of the stud 14 terminates into a transverse pivot 15, which engages at its opposite ends in the openings 16 of a pair of tensioning eye-bolts 17. A post 18 is fixed to a rest plate 19 and extends upwardly therefrom. Reinforcing webs 20 and 21 are fixed to the rest plate 19 and to the post 18 to stiffen the latter. The rest plate 19 is firmly anchored to a concrete base 22, or the like, by means of anchor bolts 23. A rigid cross-piece member 24 extends transversely behind the post 18. The tensioning eye-bolts 17 project through the cross-piece member 24 at the opposite ends thereof and nuts 25 cooperate with the eye-bolts 17 to adjustably vary the distance of the pulleys 2 or 3, as the case may be, from the corresponding post 18. The transverse pivot 15 cooperates with the eye-bolts 17 to define an horizontal pivoting axis around which the corresponding shore pulley 2 or 3 can freely pivot up and down to adopt the angle of the endless cable 1 adjacent the shore pulley.

As best illustrated in FIGS. 5 to 9 inclusive, a number of fish-lines 26 are attached to the endless cable 1 in spaced-apart relationship along the length thereof. Each fish-line 26 has a fish-hook 27 attached at one end and a float 28 fixed at a distance from the fish-hook 27 intermediate the ends of the fish-line 26 to maintain the fish-line upright from the cable 1 in the body of water, as shown in FIG. 1. A snap-hook 29 is attached at the opposite end of the fish-line 26 and is provided to engage a hook 30 firmly fixed to the endless cable 1 by means of a U-clamp 31. Obviously, other clamping expedients could be resorted to attach the fish-lines 26 to the endless cable 1, but the expedient shown and described is found advantageous for its quick disconnect feature allowing easy removal and replacement of any fish-line.

FIGS. 10, 11, and 12 show the offshore pulley 4 anchored on the bottom 32 of the body of water 5. The offshore pulley 4 is rotatably mounted on an axle 33 extending vertically or substantially vertically between a baseplate 34 and an arm 35. A nut 36 locks the axle 33 in place. A post 37 is fixed on the base plate 34 and extends upwardly therefrom. The arm 35 is rigidly mounted on the post 37. In the embodiment illustrated, the post 37 is constructed of metal plates welded together, but other constructions are also contemplated. Three anchor toes 38 are fixed to the undersurface of the baseplate 34 and project downwardly therefrom. The anchor toes 38 are shaped and aligned such as to offer maximum resistance in a direction opposite to the pull of the endless cable 1 on the offshore pulley 4. In addition to the anchor toes 38, there are provided four guys 39 solidly fixed at one end to the baseplate 34, or the post 37, and at their other ends to the bottom 32 of the body of water 5. A lifting ring 40 is conveniently located on top of the arm 35 in order to allow a means to suspend the offshore pulley structure for its lowering to the bottom 32 of the body of water 5.

The pulley 4 comprises a central core 41 and sides 42 of metal separated by a number of alternatively disposed layers of metal 43 and wood 44. A number of bolts 45 are provided to hold the layers 41, 42, 43, and 45 together. Various other modes of construction of the pulley 4 could be used as well as the one illustrated and described.

As shown in FIG. 14, the size of the offshore pulley 4 and of its groove is such that the fish-lines 26 will not project past the peripheral edges determined by the metal sides 42, such that the fish-lines 26 will not entangle with any structure adjacent the offshore pulley 4.

FIGS. 15 to 18 inclusive show a motor drive adapted to advance the endless cable 1. The motor drive comprises a motor 46 connected to rotate a driving pulley 47 cooperating with two idler pulleys 48 and 49 engaging the endless cable 1. A supporting bracket 50 includes two spaced arms 51 and 52, which are provided to support the axle of the driving pulley 47.

The drive shaft 53 of the motor 46 is coupled at 54 to a worm 55 engaging a worm gear 56 mounted on an axle 57. A clutch having a pair of clutch plates 58 and 59 are interposed between the driving pulley 47 and worm gear 56. The plate 59 is axially slidable on axle 57 in order to selectively engage or disengage the other plate 58. A crank lever 60 is pivoted at 61 to a support 62 such that the arm 63 of the crank lever 60 engages the slidable clutch plate 59 to actuate the clutch and control the rotation of the driving pulley 47 and the advance of the endless cable 1.

Conventional angle iron frames 64 and 65 are provided to support the drive motor 46 and the worm gear and clutch arrangement respectively. A pair of brackets 66 are shown to fixedly support the idler pulleys 48 and 49.

Whenever it is desired to collect clams or the like shellfish, fish hooks 27 are replaced by conventional wire mesh traps (not shown) which consist of frusto-conical enclosures with an access hole at the apex. The traps are baited and attached to the outgoing run of cable 1 only and said run pulled back to shore after a certain fishing time.

What I claim is:

1. An endless fishing cable device comprising an endless cable, a number of fish-lines attached to said endless cable in spaced-apart relationship along the latter, pulleys constructed and arranged to support said endless cable, one of said pulleys being mounted on a structure having anchoring projections extending therefrom, such that said structure is adapted to be anchored on the ground, said one pulley being so proportioned relative to the length of the fish-lines that the latter will not be long enough to project laterally outwardly past the edges of said one pulley 2. An endless fishing cable installation comprising one pulley mounted on a structure, anchoring projections extending from said structure such that the latter is arranged to be anchored on the bottom of a body of water, at least another pulley adapted to be mounted on the shore of the body of water, an endless cable trained on and supported by said pulleys, a number of fish-lines attached to said endless cable in spaced-apart relationship along the latter, floats fixed to said fish-lines to maintain the same upright from said cable in the body of water, said one pulley being so proportioned relative to the length of the fish-lines, so that the latter will not be long enough to project laterally outwardly past the edges of said one pulley, and a cable advance mechanism adapted to be mounted on the shore of the body of water and cooperatively associated with that portion of the endless cable close to said another pulley.

* * * * *